US012614944B2

(12) United States Patent 
Kim et al.

(10) Patent No.: US 12,614,944 B2 
(45) Date of Patent: Apr. 28, 2026

(54) INSULATION STRUCTURE

(71) Applicant: HYUNDAI MOBIS CO., LTD., Seoul (KR)

(72) Inventors: Yong Ho Kim, Seoul (KR); Jae Hak Lee, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 196 days.

(21) Appl. No.: 18/494,338

(22) Filed: Oct. 25, 2023

(65) Prior Publication Data

US 2024/0322631 A1 Sep. 26, 2024

(30) Foreign Application Priority Data

Mar. 22, 2023 (KR) ........................ 10-2023-0037202

(51) Int. Cl.
*H02K 3/34* (2006.01)
*H02K 3/28* (2006.01)
*H02K 15/10* (2006.01)

(52) U.S. Cl.
CPC ............... *H02K 3/345* (2013.01); *H02K 3/28* (2013.01); *H02K 15/105* (2013.01)

(58) Field of Classification Search
CPC ........ H02K 3/345; H02K 3/28; H02K 15/105; H02K 11/014; H02K 3/30; H02K 5/161; H02K 2205/12; H02K 2213/03; H02K 3/42; H02K 3/38; H02K 3/32; H01F 5/00; H01F 27/363
See application file for complete search history.

(56) References Cited

U.S. PATENT DOCUMENTS

| | | | |
|---|---|---|---|
| 5,979,087 A | 11/1999 | Bell et al. | |
| 7,113,365 B1 | 9/2006 | Ryan et al. | |
| 2008/0238230 A1 | 10/2008 | Mochida et al. | |
| 2017/0294816 A1 * | 10/2017 | Ren ........................ | H02K 15/10 |
| 2022/0255394 A1 | 8/2022 | Buerkert et al. | |

FOREIGN PATENT DOCUMENTS

| | | | | |
|---|---|---|---|---|
| EP | 3185405 A1 * | 6/2017 | ............... | H02K 3/42 |
| EP | 3185405 B1 * | 10/2018 | ............... | H02K 3/38 |
| JP | 2006-262545 A | 9/2006 | | |
| JP | 2012-5307 A | 1/2012 | | |
| KR | 10-2022-0136837 A | 10/2022 | | |
| KR | 10-2022-0160485 A | 12/2022 | | |
| WO | WO 2016/091360 A2 | 6/2016 | | |
| WO | WO 2016/091360 A3 | 6/2016 | | |
| WO | WO 2022/024365 A1 | 2/2022 | | |

OTHER PUBLICATIONS

Korean Office Action Issued on May 22, 2024, in Counterpart Korean Patent Application No. 10-2023-0037202 (5 Pages in Korean).
Extended European Search Report issued on Jul. 18, 2024, in corresponding European Patent Application No. 24151526.1. (11 pages in English).

* cited by examiner

*Primary Examiner* — Thomas Truong
(74) *Attorney, Agent, or Firm* — NSIP Law

(57) ABSTRACT

An insulation structure applied to each of two ends of a stator in an axial direction to block an electric field of an end coil assembly from being applied to a motor shaft. The structure includes: a conducting part extending in a predetermined induction direction parallel to a direction in which the end coil assembly is pulled out from the stator; and an insulating part positioned between the conducting part and the end coil assembly to insulate the conducting part.

8 Claims, 7 Drawing Sheets

[FIG. 1]
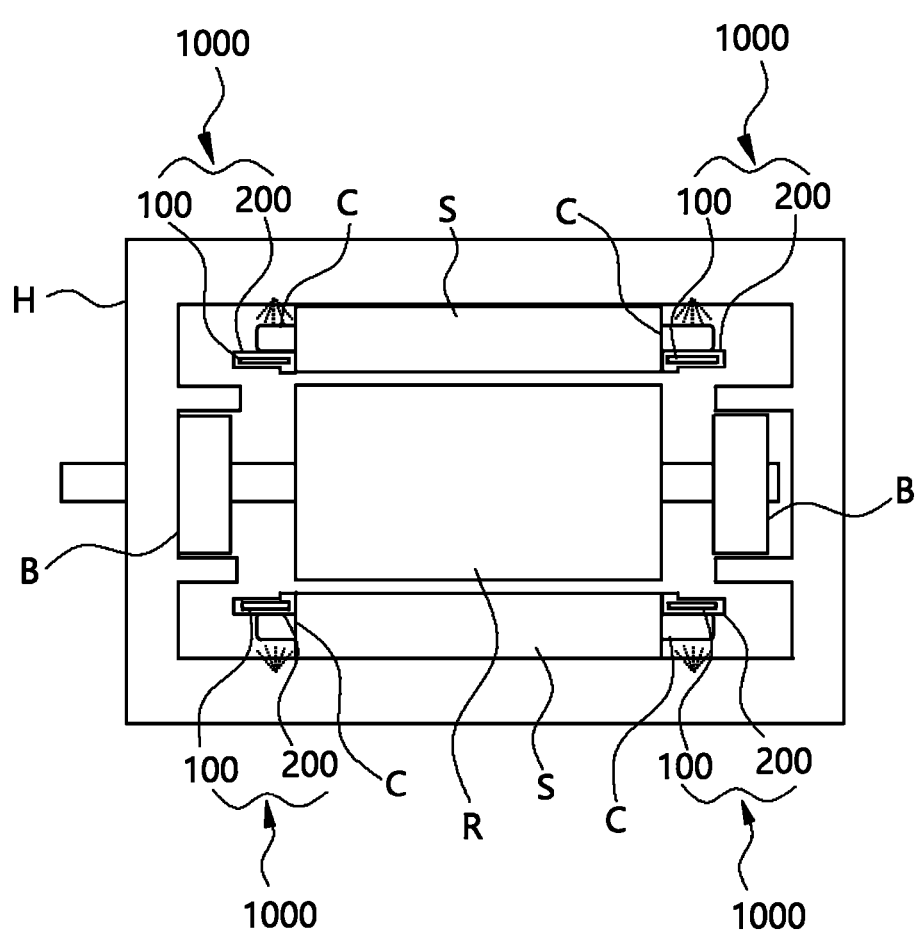

[FIG. 2]
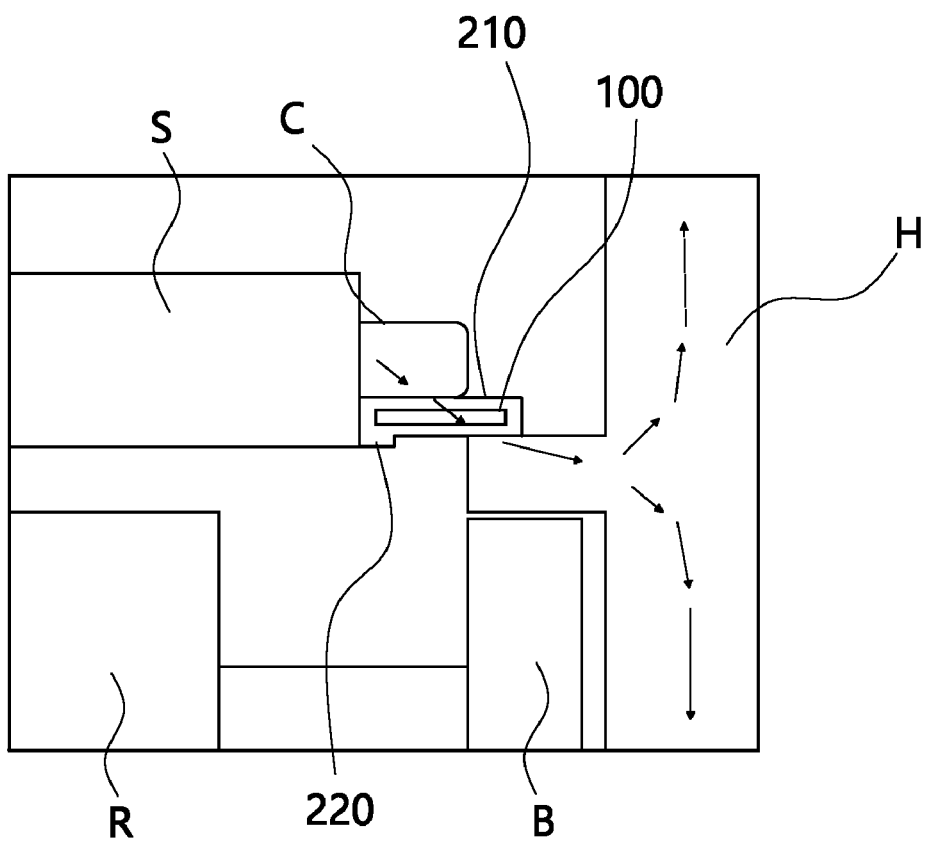

[FIG. 3]
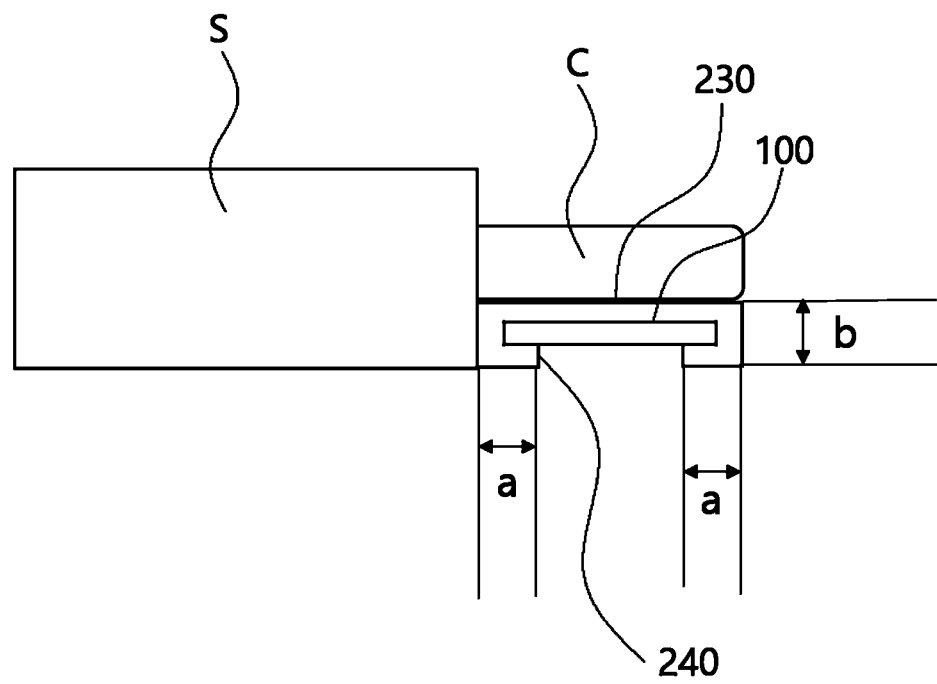

[FIG. 4]
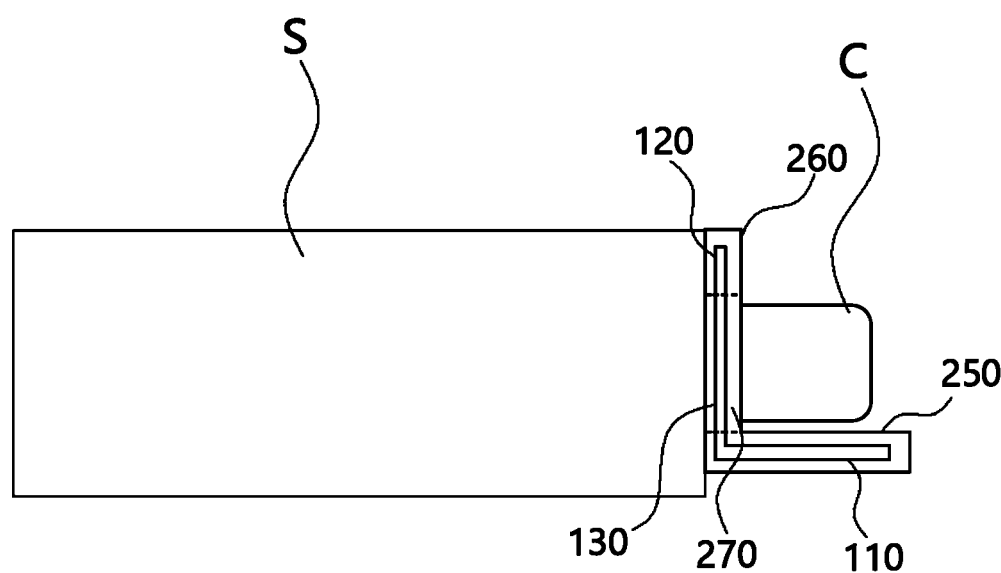

[FIG. 5]
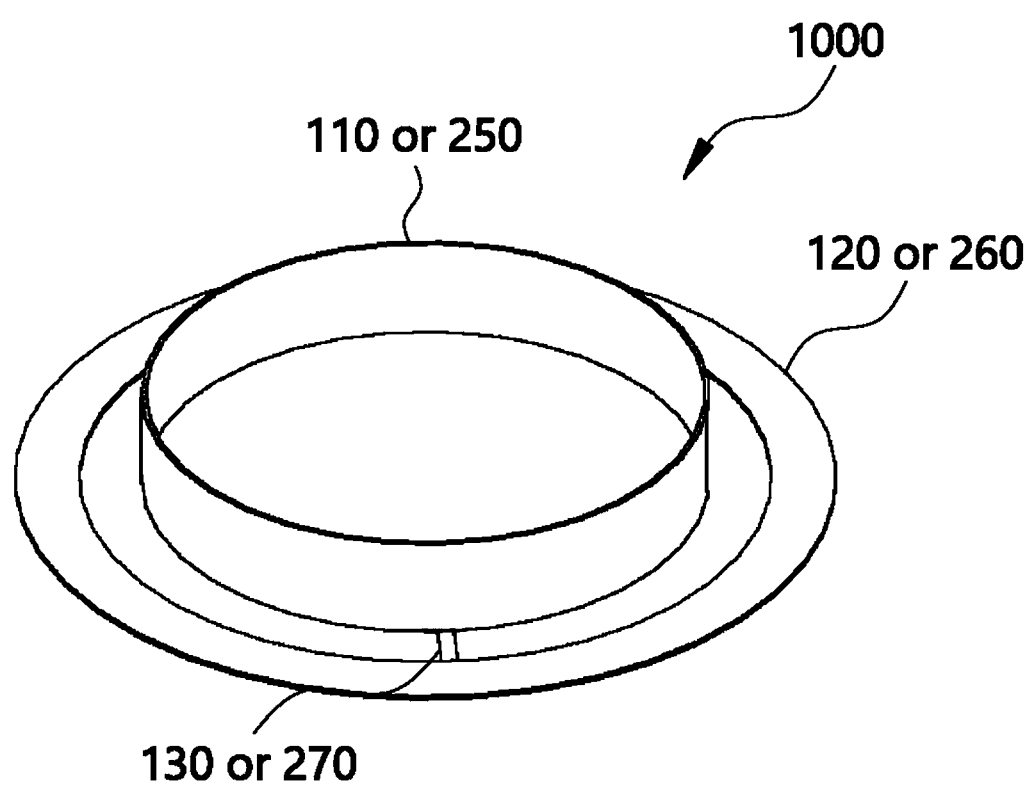

[FIG. 6]
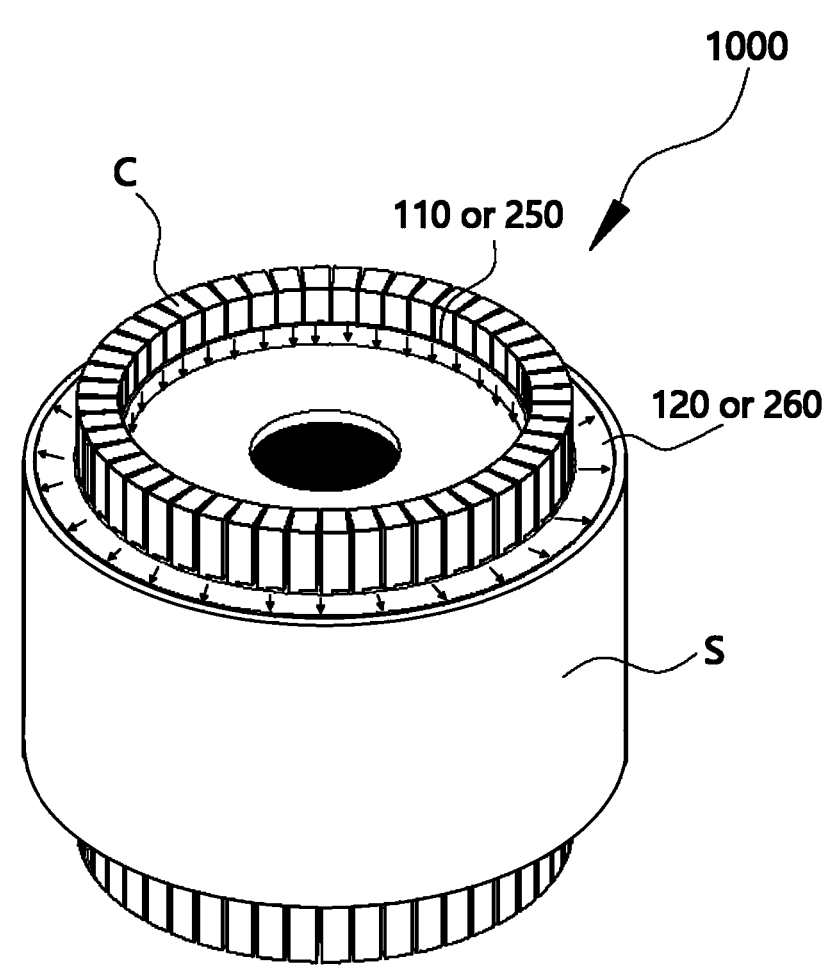

[FIG. 7]
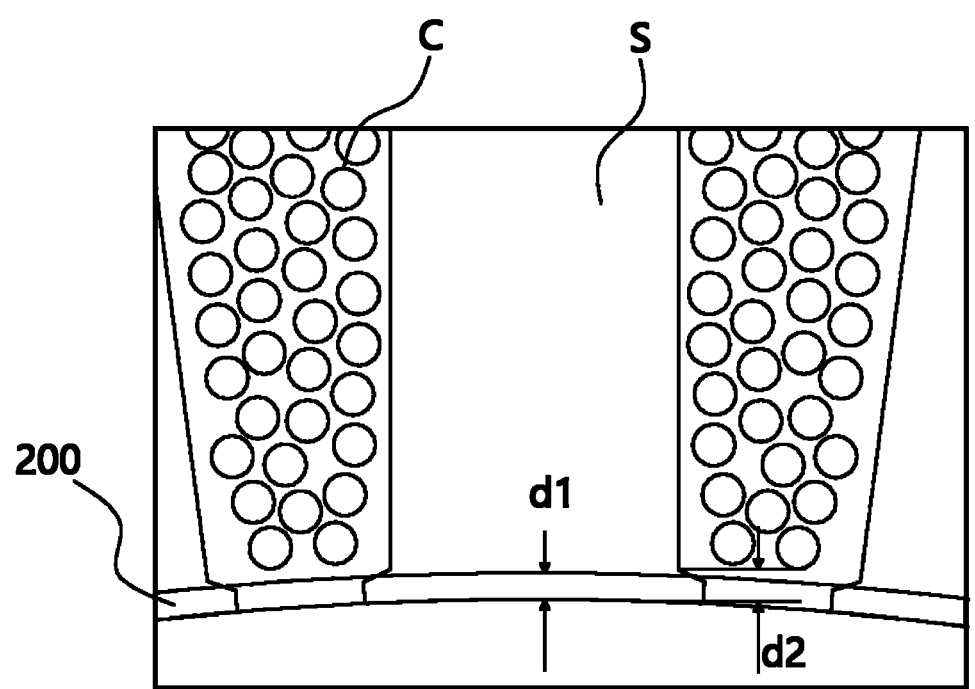

INSULATION STRUCTURE

CROSS-REFERENCE TO RELATED APPLICATIONS

This application claims priority under 35 U.S.C. § 119 to Korean Patent Application No. 10-2023-0037202, filed on Mar. 22, 2023, in the Korean Intellectual Property Office, the entire disclosure of which is incorporated herein by reference for all purposes.

TECHNICAL FIELD

The following disclosure relates to an insulation structure applied to a motor.

BACKGROUND

A prior interior permanent magnet (IPM)-type motor has a permanent magnet embedded in a rotor, and may be driven by pulse width modulation (PWM) control of an inverter delivering power to a coil assembly. A common mode voltage may be applied to parasitic capacitance of the motor by the PWM control, thus generating an axis voltage between the shaft axis and bearing of the motor.

When the axis voltage is generated between the shaft axis of the motor and the bearing, and a bearing ball and an inner/outer ring come into contact with each other in a case where the motor is running, an axis current may flow through the bearing due to the axis voltage, which may cause bearing corrosion. The bearing corrosion may cause a bearing noise and excessive vibration, which may cause motor failure in the long term.

In addition, as specifications required for the motor are gradually increased, a voltage of the power applied to the motor may be increased, and a carrier frequency used by the inverter may tend to be increased. As a result, the axis voltage and the axis current, which are main causes of the bearing corrosion, may also be increased, resulting in an increase in the frequency of failures caused by the bearing corrosion.

In order to solve this problem, the prior art may use a ceramic bearing, an SGR bearing, or an RGC bearing. However, in this case, a material cost may be increased. In addition, even though using such an anti-corrosion structure, a motor adopting an oil cooling method may have an oil film formed between its structure and a rotor assembly, and thus have a significantly lower anti-corrosion effect.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An embodiment of the present disclosure is directed to providing an insulation structure which may reduce a production cost by adopting a method of reducing a magnitude of an axis voltage itself instead of using an expensive ceramic bearing and proposing an insulation structure that may be directly applied to an end coil to thus minimize a motor failure caused by corrosion, and simultaneously use an inexpensive steel ball bearing.

In one general aspect, an insulation structure applied to each of two ends of a stator in an axial direction to block an electric field of an end coil assembly from being applied to a motor shaft includes: a conducting part extending in a predetermined induction direction parallel to a direction in which the end coil assembly is pulled out from the stator and inducing the electric field of the end coil assembly to be directed in the induction direction; and an insulating part positioned between the conducting part and the end coil assembly to insulate the conducting part.

The conducting part may be positioned inside the end coil assembly, and the insulating part may surround the conducting part, and include an insulating paper having a first surface in contact with an inner surface of the end coil assembly.

The insulating paper may include a first insulating part bent and surrounding an entire outer surface of the conducting part, and a coupling part formed by pulling out and coupling both ends of the first insulating part to each other.

The conducting part may extend in the induction direction to be longer than a maximum length of the end coil assembly pulled out from each of the two ends of the stator.

A second surface of the insulating paper may be in contact with the motor housing, and one of the first and second surfaces of the insulating paper may be spaced apart from the motor shaft and a rotor structure by a predetermined distance.

The insulating paper may include a second insulating part bent and surrounding a first surface of the conducting part, and a third insulating part formed by pulling out both ends of the second insulating part and bending the ends to partially surround a second surface of the conducting part.

The conducting part may include a first conducting part positioned inside the end coil assembly, a second conducting part positioned on each of the two ends of the stator and positioned outside the end coil assembly, and a connecting part having two ends to which the first conducting part and the second conducting part are respectively connected, and the insulating paper surrounds the conducting part, and is in contact with the inner surface of the end coil assembly and each of the two ends of the stator.

The insulating paper may include a fourth insulating part surrounding an entire outer surface of the first conducting part and in contact with the inner surface of the end coil assembly, a fifth insulating part surrounding an entire outer surface of the second conducting part and in contact with either end of the stator, and a sixth insulating part surrounding an entire outer surface of the connecting part.

A thickness of the insulating paper may be smaller than a shoe thickness of a stator core of the stator.

Other features and aspects will be apparent from the following detailed description, the drawings, and the claims.

BRIEF DESCRIPTION OF THE DRAWINGS

FIG. 1 is a cross-sectional view showing an internal structure of a motor using a first embodiment of an insulation structure of the present disclosure.

FIG. 2 is a schematic view showing an application form of a first embodiment of the insulation structure of the present disclosure.

FIG. 3 is a schematic view showing a second embodiment of the insulation structure of the present disclosure.

FIG. 4 is a schematic view showing a third embodiment of the insulation structure of the present disclosure.

FIG. 5 is a perspective view showing a third embodiment of the insulation structure of the present disclosure.

FIG. 6 is a perspective view of a stator using a third embodiment of the insulation structure of the present disclosure.

FIG. 7 is a partial plan view of a stator using the insulation structure of the present disclosure.

DETAILED DESCRIPTION

Hereinafter, the spirit of the present disclosure is described in more detail with reference to the accompanying drawings. Terms and words used in the specification and claims are not to be construed as general or dictionary meanings, and are to be construed as meanings and concepts meeting the spirit of the present disclosure based on a principle in which the inventors may appropriately define the concepts of terms in order to describe their inventions in the best mode.

Hereinafter, the description describes a basic configuration of an insulation structure 1000 and a first embodiment of the present disclosure with reference to FIG. 1.

The insulation structure 1000 of the present disclosure may be applied to each of two ends of a stator S in an axial direction to block an electric field of an end coil assembly C from being applied to a motor shaft, and serve to prevent the electric field from the coil assembly inserted into the stator S from being delivered to a rotor structure R. In detail, the insulation structure 1000 of the present disclosure may include a conducting part 100 and an insulating part 200. The conducting part 100 may extend in an induction direction parallel to a direction in which the end coil assembly C is pulled out from the stator S, and thus induce the electric field of the end coil assembly C to be directed in the induction direction. In addition, the insulating part 200 may be positioned between the conducting part 100 and the end coil assembly C to insulate the conducting part 100.

In detail, as shown in a first embodiment shown in FIG. 1, in the present disclosure of the insulation structure 1000, the conducting part 100 may be positioned inside the end coil assembly C (to be close to the rotor structure R), and the insulating part 200 may surround the conducting part 100. Here, the insulating part 200 may include an insulating paper having one surface in contact with an inner surface of the end coil assembly C. Here, the insulating paper may include a first insulating part 210 bent and surrounding an entire outer surface of the conducting part 100, and a coupling part 220 formed by pulling out and coupling both ends the first insulating part 210 to each other. The coupling part 220 may be formed by bond-coupling both the ends of the first insulating part 210 to each other.

The electric field of the end coil assembly C may be moved along the conducting part 100 by adopting a first embodiment of the insulation structure 1000 of the present disclosure, thus minimizing the electric field delivered to the rotor structure R. In addition, the insulating part 200 may surround the entire surface of the conducting part 100, and the conducting part 100 and the end coil assembly C may thus be insulated from each other without a current flowing therebetween. Accordingly, compared to a method of inducing the electric field by grounding to the end coil, it is possible to induce the electric field without connecting each end coil strand with the conducting part 100, thereby increasing manufacturing convenience and stability. In addition, the insulating part 200 may protect the conducting part 100 from an external stimulus such as cooling oil, thus maintaining durability of a motor.

Further, the coupling part 220 may be disposed at each of two ends of the conducting part 100 in an extension direction, and in contact with each of the two ends of the stator S. Accordingly, the coupling part 220 may not interfere with an electric field delivery path, thus maximizing an axis voltage reduction effect, and prevent the bonding of the coupling part 220 from being damaged by the cooling oil or a motor housing H.

The following is a comparison of changes in a charge on a surface of the rotor structure R based on whether a first embodiment of the insulation structure 1000 of the present disclosure is applied thereto. As a result, it is confirmed that the charge remains on the surface of the rotor structure R when the insulation structure 1000 is not applied to the end coil assembly C. On the other hand, it may be confirmed that the charge on the surface of the rotor structure R is reduced when a first embodiment of the insulation structure 1000 is applied to the end coil assembly C. It is confirmed also from an experiment that the axis voltage is decreased by about 69% in an experimental group to which a first embodiment of the insulation structure 1000 of the present disclosure is applied, compared to a non-experimental group.

In addition, the insulating part 200 of the insulation structure 1000 of the present disclosure may be formed by depositing insulation coating of the end coil assembly C, and the conducting part 100 may be in contact with the deposited insulation coating of the end coil assembly C.

Hereinafter, the description describes an application form of a first embodiment of the insulation structure 1000 of the present disclosure in more detail with reference to FIG. 2.

In a first-1-th embodiment of the insulation structure 1000 of the present disclosure shown in FIG. 2, the conducting part 100 may extend in the induction direction to be longer than the maximum length of the end coil assembly C pulled out from each of the two ends of the stator S. Accordingly, the insulation structure 1000 of the present disclosure may more reliably shield the electric field of the end coil assembly C from being delivered to the rotor structure R.

Further, in a first-2-th embodiment of the insulation structure 1000 of the present disclosure shown in FIG. 2, the other surface of the insulating paper may be in contact with the motor housing H by an extension length of the conducting part 100, and one surface or the other surface of the insulating paper may be spaced apart from the motor shaft and the rotor structure R by a predetermined distance. Accordingly, as shown by an arrow in FIG. 2, the electric field may be moved (or delivered in an order of the end coil assembly C, the insulation structure 1000, and then the motor housing H). Therefore, an electric field movement path may be more clearly secured compared to a basic form of a first embodiment.

Hereinafter, the description describes a second embodiment of the insulation structure 1000 of the present disclosure in more detail with reference to FIG. 3.

In a second embodiment of the insulation structure 1000 of the present disclosure shown in FIG. 3, the insulating paper may include a second insulating part 230 bent and surrounding one surface of the conducting part 100, and a third insulating part 240 formed by pulling out both ends of the second insulating part 230 and bending the same to partially surround the other surface of the conducting part 100. Here, a length 'a' of the third insulating part 240 surrounding the other surface of the conducting part 100 may be 2 mm or more, and may be less than 0.5 times the extension length of the conducting part 100. In addition, a length a+b of the third insulating part 240 extending from the second insulating part 230 may be 2 mm or more. In addition, an open portion of the conducting part 100 may be bonded to protect the conducting part 100 from an external environment such as the cooling oil.

It is thus possible to lower a cost of materials used for the insulating part 200 by adopting a second embodiment of the insulation structure 1000 of the present disclosure. In addition, the insulating part 200 may be partially open, and the conducting part 100 may thus be easily attached and detached even after the insulating part 200 is bent, thereby increasing convenience in product repair and supplementation.

Hereinafter, the description describes a third embodiment of the insulation structure 1000 of the present disclosure in more detail with reference to FIGS. 4 to 6.

In a third embodiment of the insulation structure 1000 of the present disclosure shown in FIG. 4, the conducting part 100 may include a first conducting part 110 positioned inside the end coil assembly C, a second conducting part 120 positioned on each of the two ends of the stator S and positioned outside the end coil assembly C, and a connecting part 130 connecting the first conducting part 110 with the second conducting part 120. Here, the insulating paper may surround the conducting part 100, and be in contact with the inner surface of the end coil assembly C and each of the two ends of the stator S.

In detail, as shown in FIG. 5, the insulating paper may include a fourth insulating part 250 surrounding an entire outer surface of the first conducting part 110 and in contact with the inner surface of the end coil assembly C, a fifth insulating part 260 surrounding an entire outer surface of the second conducting part 120 and in contact with either end of the stator S, and a sixth insulating part 270 surrounding an entire outer surface of the connecting part 130.

Here, two or more connecting parts 130 may be provided and spaced apart from each other at equal intervals. It is thus possible to lower a failure rate of the electric field movement path. Only one connecting part 130 may be provided when the failure rate does not need to be considered (that is, when production accuracy is secured). In addition, a width of connecting part 130 may be smaller than 80% of a tooth thickness of the stator S. Accordingly, the insulating part 200 may not interfere with the pulling out of the end coil assembly C.

As shown by an arrow in FIG. 6, the electric field may be moved in an order of the end coil assembly C, the first conducting part 110, the connecting part 130, the second conducting part 120, and then the motor housing H by adopting a third embodiment of the insulation structure 1000 of the present disclosure. That is, the electric field may be induced outside the stator S (that is, opposite to the rotor structure R, and toward the motor housing H). Accordingly, there may be no limitation in designing the motor using the insulation structure 1000 of the present disclosure. That is, it is possible to clearly secure the electric field movement path, and minimize the delivery of the electric field to the rotor structure R even when the two ends of the end coil assembly C and motor housing H of the motor are not adjacent to each other. It is confirmed also from an experiment that the axis voltage is decreased by about 28% in an experimental group to which a third embodiment of the insulation structure 1000 of the present disclosure is applied, compared to a non-experimental group.

Hereinafter, the description describes a fourth embodiment of the insulation structure 1000 of the present disclosure in more detail with reference to FIG. 7.

As described above, the insulating paper of the insulating part 200 may have a circular band shape, and its inner diameter may be larger than an inner diameter of a stator core by a predetermined error range, and the error range may be at least 0.4 mm. In addition, as shown in FIG. 9, a thickness d1 of the insulating paper may be smaller than a shoe thickness d2 of the stator core of the stator S. In addition, the thickness of the insulating paper may be 0.3 mm or more for ease of manufacture.

As set forth above, the insulation structure of the present disclosure including the above configuration may reduce the production cost by adopting the method of reducing the magnitude of the axis voltage itself instead of using the expensive ceramic bearing and proposing the insulation structure that may be directly applied to the end coil to thus minimize the motor failure caused by the corrosion, and simultaneously use the inexpensive steel ball bearing.

The spirit of the present disclosure should not be limited to the embodiments described above. The present disclosure may be applied to various fields, and may be variously modified by those skilled in the art without departing from the scope of the present disclosure claimed in the claims. Therefore, it is obvious to those skilled in the art that these alterations and modifications fall within the scope of the present disclosure.

What is claimed is:

1. An insulation structure applied to each of two ends of a stator in an axial direction to block an electric field of an end coil assembly from being applied to a motor shaft, the structure comprising:
   a conducting part extending in a predetermined induction direction parallel to a direction in which the end coil assembly is pulled out from the stator; and
   an insulating part positioned between the conducting part and the end coil assembly to insulate the conducting part,
   wherein the conducting part is positioned inside the end coil assembly, and the insulating part surrounds the conducting part, and the insulating part comprises an insulating paper having a first surface in contact with an inner surface of the end coil assembly.

2. The insulation structure of claim 1, wherein the insulating paper includes:
   a first insulating part bent and surrounding an entire outer surface of the conducting part; and
   a coupling part formed by bonding together both ends of the first insulating part.

3. The insulation structure of claim 2, wherein the conducting part extends in the induction direction to be longer than a maximum length of the end coil assembly pulled out from each of the two ends of the stator.

4. The insulation structure of claim 3, wherein a second surface of the insulating paper is in contact with the motor housing, and
   one of the first and second surfaces of the insulating paper is spaced apart from the motor shaft and a rotor structure by a predetermined distance.

5. The insulation structure of claim 1, wherein the insulating paper includes:
   a second insulating part bent and surrounding a first surface of the conducting part; and
   a third insulating part formed by extending and bending both ends of the second insulating part to partially surround a second surface of the conducting part.

6. The insulation structure of claim 1, wherein the conducting part includes:
   a first conducting part positioned inside the end coil assembly;

a second conducting part positioned on each of the two ends of the stator and positioned outside the end coil assembly; and a connecting part having two ends to which the first conducting part and the second conducting part are respectively connected, and wherein the insulating paper surrounds the conducting part, and is in contact with the inner surface of the end coil assembly and each of the two ends of the stator.

7. The insulation structure of claim 6, wherein the insulating paper includes:

a fourth insulating part surrounding an entire outer surface of the first conducting part and in contact with the inner surface of the end coil assembly;

a fifth insulating part surrounding an entire outer surface of the second conducting part and in contact with either end of the stator; and a sixth insulating part surrounding an entire outer surface of the connecting part.

8. The insulation structure of claim 1, wherein a thickness of the insulating paper is smaller than a shoe thickness of a stator core of the stator.

*  *  *  *  *